(12) United States Patent  (10) Patent No.: US 8,704,732 B2
Pourbigharaz et al.  (45) Date of Patent: Apr. 22, 2014

(54) IMAGE SYNCHRONIZATION FOR MULTIPLE DISPLAYS

(75) Inventors: Fariborz Pourbigharaz, Thornhill (CA); Samson Sae-Young Kim, Markham (CA); Ivan Wong Yin Yang, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 13/246,652

(22) Filed: Sep. 27, 2011

(65) Prior Publication Data

US 2012/0075334 A1    Mar. 29, 2012

Related U.S. Application Data

(60) Provisional application No. 61/387,896, filed on Sep. 29, 2010.

(51) Int. Cl.
 *G09G 5/00* (2006.01)
(52) U.S. Cl.
 USPC .......................................................... 345/1.1
(58) Field of Classification Search
 None
 See application file for complete search history.

(56) References Cited

U.S. PATENT DOCUMENTS

| 5,027,212 | A * | 6/1991 | Marlton et al. ............... 348/512 |
| 6,181,300 | B1 | 1/2001 | Poon et al. |
| 6,262,695 | B1 | 7/2001 | McGowan |
| 7,456,804 | B2 | 11/2008 | Fukue |
| 7,499,044 | B2 | 3/2009 | Kennedy et al. |
| 2007/0263122 | A1 | 11/2007 | Araki |
| 2007/0285416 | A1 * | 12/2007 | Wang ............................ 345/213 |
| 2010/0111491 | A1 | 5/2010 | Kamoto |
| 2010/0194666 | A1 | 8/2010 | Lindner et al. |

FOREIGN PATENT DOCUMENTS

| EP | 1785981 A1 | 5/2007 |
| WO | 03060623 A2 | 7/2003 |

OTHER PUBLICATIONS

International Search Report and Written Opinion of international application No. PCT/US2011/053747, dated Dec. 15, 2011, 12 pp.
Wikipedia page: Display Serial Interface, last modified Sep. 6, 2009, 2 pp.
Display Interface Specifications/MIPI Alliance, MIPI Alliance (http://www.mipi.org/), accessed Nov. 8, 2010, 7 pp.
International Preliminary Report on Patentability from International Application No. PCT/US2011/053747, dated Jan. 30, 2013, 29 pp.
Reply to Written Opinion dated Dec. 15, 2011, from International Application No. PCT/US2011/053747, filed Jul. 25, 2012, 36 pp.

(Continued)

*Primary Examiner* — Nicholas Lee
(74) *Attorney, Agent, or Firm* — Shumaker & Sieffert, P.A.

(57) ABSTRACT

This disclosure describes techniques for controlling a plurality of displays to present an image split across the displays. For example, a host controller is described herein. The host controller receives, from a first display, a first display status that indicates a status of presentation of a first portion of an image by the first display and, from a second display a second display status that indicates a status of presentation of a second portion of the image by the second display. The host controller may compare the first and second display status and, in response to the comparison, communicate to at least one of the first and second displays a display adjustment configured to cause the respective display to adjust presentation of at least one of the first or second portion of the image.

47 Claims, 6 Drawing Sheets

(56) References Cited

OTHER PUBLICATIONS

Second Written Opinion from International Application No. PCT/US2011/053747, dated Oct. 1, 2012, 7 pp.

Reply to Second Written Opinion dated Oct. 1, 2012, from International Application No. PCT/US2011/053747, filed Nov. 29, 2012, 37 pp.

* cited by examiner

IMAGE SYNCHRONIZATION FOR MULTIPLE DISPLAYS

This application claims the benefit of U.S. Provisional Application No. 61/387,896 filed Sep. 29, 2010, which is hereby incorporated by reference in its entirety.

TECHNICAL FIELD

This disclosure relates to controlling one or more images presented split across multiple display units.

BACKGROUND

In general, display units configured to present one or more images may be grouped into two categories, smart displays and dumb displays. A dumb display receives timing and synchronization information besides image data from a host controller whereas a smart display does not require such timing and synchronization information. In some example, a smart display may include one or more frame buffers. In some examples, a smart display may also or instead include an internal clock reference used by the smart display to operate to present images.

SUMMARY

This disclosure is directed to techniques for controlling the presentation of one or more images presented across a plurality of display devices, i.e., split between the display devices. According to these techniques, in some examples, a host controller may receive from a first display status that indicates a status of a first display to present a first portion of an image. The host controller may also receive a second display status that indicates a status of a second display to present a second portion of the image. In some examples, the first and second display status may be referred to as a horizontal synch (hsync) or vertical synch (vsync) signal. The host controller may compare the first display status and second display status to determine an offset that indicates a difference between a status of the first and second display to present the respective first portion and second portions of the image. For example, the offset may indicate a difference between a number of sub-portions (e.g., lines) of the first image portion presented by the first display and a number of sub-portions of the second image portion presented by the second display. In response to the determined offset, the host controller may communicate a display adjustment to at least one of the first and second displays. The display adjustment may cause the first display or the second display to adjust presentation of the first portion or the second portion of the image. For example, the display adjustment may cause the first display or the second display to adjust presentation of at least one sub-portion (e.g., line) of one or more of the first and second portions of the image, such as by adjusting a presentation time of the at least one sub-portion.

According to one example, a method is described herein. The method includes receiving, from a first display, a first display status that indicates a status of presentation of a first portion of an image by the first display. The method further includes receiving, from a second display, a second display status that indicates a status of presentation of a second portion of the image by the second display. The method further includes determining a difference between the status of presentation of the first portion of an image by the first display and the status of presentation of the second portion of an image by the second display. The method further includes adjusting, based on the determined difference, at least one of presentation of the first portion of the image by the first display or presentation of the second portion of the image by the second display.

According to another example, a device is described herein. The device includes a display status module configured to receive a first display status that indicates a status of presentation of a first portion of an image by a first display and a second display status that indicates a status of presentation of a second portion of the image by a second display. The device further includes an offset determination module configured to determine, based on the first display status and the second display status, a difference between the status of presentation of the first portion of an image by the first display the status of presentation of the second portion of an image by the second display. The device further includes a display adjustment module configured to communicate, to at least one of the first and second displays, a display adjustment configured to adjust at least one of presentation of the first portion of the image by the first display or presentation of the second portion of the image by the second display.

According to another example, a device is described herein. The device includes means for receiving, from a first display, a status of presentation of a first portion of an image by the first display. The device further includes means for receiving, from a second display, a second display status that indicates a status of presentation of a second portion of the image by the second display. The device further includes means for determining a difference between the status of the first display to output the first portion of the at least one image and a status of the second display to output the second portion of the at least one image. The device further includes means for adjusting, based on the determined difference, at least one of presentation of the first portion of the image by the first display or presentation of the second portion of the image by the second display.

According to another example, a computer-readable storage medium comprising instructions is described herein. The instructions are configured to, upon execution by a computing device, cause the computing device to receive, from a first display, a first display status that indicates a status of presentation of a first portion of an image by the first display. The instructions are further configured to cause the computing device to receive, from a second display, a second display status that indicates a status of presentation of a second portion of the image by the second display. The instructions are further configured to cause the computing device to determine a difference between the status of presentation of the first portion of an image by the first display the status of presentation of the second portion of an image by the second display. The instructions are further configured to cause the computing device to adjust, based on the determined difference, at least one of presentation of the first portion of the image by the first display or presentation of the second portion of the image by the second display.

The details of one or more examples of this disclosure are set forth in the accompanying drawings and the description below. Other features, objects, and advantages of the techniques described herein will be apparent from the description and drawings, and from the claims.

DETAILED DESCRIPTION

Figure 1:
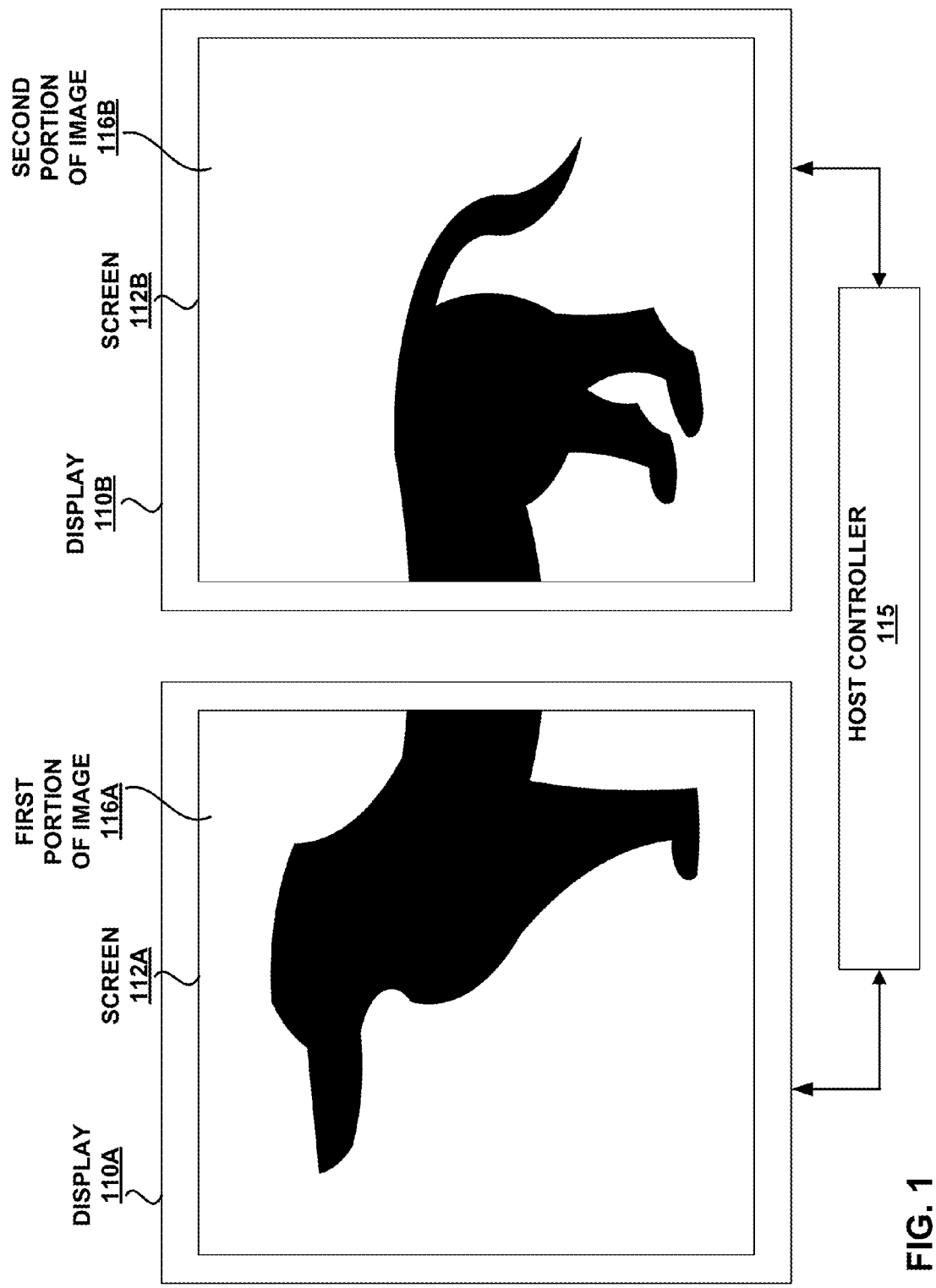
FIG. 1 is a conceptual diagram that illustrates an example of a host controller operable to control presentation of an image split across multiple displays consistent with the techniques of this disclosure.

FIG. 1 is a conceptual diagram that illustrates an example of a host controller 115 configured to control the presentation of an image 116 split across multiple display devices 110A, 110B (hereinafter displays 110A, 110B) consistent with the techniques of this disclosure. As shown in the example of FIG. 1, host controller 115 controls first display 110A to present a first portion 116A of image 116 (a dog) via screen 112A, and second display 110B to present second portion of image 116B via screen 112B. Image 116 may comprise a still image or video image (i.e., multiple images) split across displays 110A, 110B. Image 116 may further comprise a video or still image configured to appear substantially two-dimensional (2D) or three-dimensional (3D) to a viewer.

Each of displays 110A, 110B may be a standalone display device, such as a television (e.g., LCD or plasma display panel, rear projection television, projector, cathode ray tube (CRT) television or other display device). In other examples, one or more displays may comprise a computing device that includes a display. For example, one or more of displays 110A, 110B may comprise a desktop computer, a laptop computer, a smartphone, a tablet computer, a gaming device, or any computing device that includes a display or is communicatively coupled to a display. For example, one or more of displays 110A, 110B may be integrated in a computing device that includes host controller 115, or be provided separately from the host controller.

It may be desirable for a host controller 115 to output image 116 in a manner that splits the output image 116 among a plurality of displays 110A, 110B, such that different portions 116A, 116B are presented by respective displays 110A, 110B, as depicted in FIG. 1, such as where multiple displays are available and larger presentation of image 116 with a larger format is desirable. A larger format may be useful, for example, when it is desirable to present image 116 to a relatively large number of viewers, or where one or more viewers are located a distance away from display 110A.

FIG. 1 depicts host controller 115 operative to split image 116 among two displays 110A, 110B. In other examples not depicted, host controller 115 may split image 116 across more than two displays, including any number of displays, consistent with the techniques of this disclosure.

Displays 110A, 110B depicted in FIG. 1 may be "smart" displays. The phrase "smart display" may refer to a display that includes at least one clock source used as a reference to present images. In some examples, a smart display may include an internal timing reference that may be used to present one or more images via the smart display. For example, the smart display may include an internal clock reference such as a crystal oscillator or other component configured to generate a reference clock for operation of the smart display. In some examples, such a smart display may be configured to receive image data from a host controller, and present the received image data consistent with such an internal clock reference. Image data may include, for example, pixel information that indicates values associated with pixels of an image, along with other information that may be used by a display to present an image via a screen of the display.

In other examples, such a smart display may also or instead be configured to process graphics instructions and associated data (hereinafter "graphics instructions") for the display of images. According to such examples, a "smart" display may include one or more hardware and/or software components (e.g., a graphics processing unit (GPU), digital signal processor (DSP) and/or central processing unit (CPU)) configured to process graphics instructions to control a display to present image 116. According to such examples, a smart display (e.g., a GPU of the smart display) may process graphics instructions to generate image data. According to one non-limiting example, graphics instructions may include instructions to draw a particular geographical shape and properties of the shape. On the other hand, image data may include data indicating that a pixel at location X, Y, Z has a particular color or other descriptive parameter. One specific and non-limiting example of graphics instructions/data as described herein is one or more commands generated according to the OpenGL® graphical rendering protocol developed by Silicon Graphics, Inc.

In some examples, a smart display as described herein may be configured to receive and process graphics instructions, and/or image data and use received instructions and/or image data to present one or more images via a screen of the smart display. The smart display may process instructions or data and present images based on an internal clock reference. For example, a smart display may receive image data and present the received image data consistent with the internal clock reference. In other examples, a smart display may receive graphics instructions, and process the graphics instruction and/or present one or more images based on the instructions consistent with the internal clock reference.

In some examples, it may be advantageous to use smart displays 110A, 110B to display image 116 as opposed to using a dumb display. For example, using an internal frame buffer may cause a smart display to use less power than a dumb display, because less information (e.g., timing information as well as less image data such as refreshing at 30 fps rather than 60 fps) may be communicated between a host controller and the smart display, in comparison to a dumb display.

In addition, in some examples, a smart display may be configured to process graphics instructions as described above. In some examples, such graphics instructions may be represented using less data (e.g., fewer bits of information) than already processed image data. As such, in some circumstances, it may be preferable for a host controller 115 to use smart displays 110A, 110B to display images 116 as opposed to dumb displays. For example, it may be desirable to split image 116 across smart displays 110A, 110B if limited bandwidth is available for host controller 115 to communicate with displays 110A, 110B.

A smart display may use a reference clock for processing and/or image display operations. For example, a smart display may include a clock source (e.g., a crystal oscillator and/or other clock generating component) that provides such a reference clock signal. A smart display may be configured to receive and/or present image data (e.g., image data stored in a frame buffer of the smart display) according to a reference clock generated by clock source of the display. Such image data may be generated based on processed graphics instructions, or may be received by the smart display (e.g., received from host controller 115). In some examples, clock sources of displays 110A, 110B may operate independently of one another to generate respective reference clock signals for displays 110A, 110B. As such, displays 110A, 110B may not operate in exact synchronization with one another to display respective first 116A and second 116B portions of image 116. In some examples, a difference between respective clock sources of displays 110A, 110B may cause undesirable effects for a viewer when image 116 is presented split across displays 110A, and 110B. For example, such a difference between respective clock sources of displays 110A, 110B may cause tearing or other undesirable visible effects for a viewer. In some examples, such undesirable effects may occur when an image is split across displays 110A, 110B, even if displays 110A, 110B are identical to one another (e.g., a same manufacturer, model/part number). According to these examples, minor differences between clock reference frequencies generated by the respective internal clock sources of the respective displays may, in time, cause one or more visible artifacts, such as tearing, to be perceived by a viewer viewing the image split across displays 110A, 110B.

In some examples, one or more techniques may be used to directly synchronize respective clock sources of displays 110A and 110B. For example, host controller 115 may include a clock synchronizing component such as a phased locked loop (PLL), delay locked loop (DLL), or other hardware or software component(s) configured to directly synchronize respective clock sources of displays 110A and 110B to have substantially similar timing. Such techniques may be undesirable, as they may require complex circuitry and/or software, and may be expensive to implement in terms of one or more of cost, bandwidth consumed, processing power, and/or processing complexity.

The techniques of this disclosure are directed to synchronizing display output of multiple displays 110A, 110B operating to present respective portions 116A, 116B of an image 116 split among the displays. According to these techniques, a host controller 115 may receive a display status that indicates progress of display output for each of displays 116A and 116B. Such a display status may comprise, for example, an indication of a number of sub-portions of the first portion 116A of image 116 that have been output by first display 110A, and a number of sub-portions of the second portion 116B of image 116 that have been output by second display 110B. For example, host controller 115 may receive a display status that indicates of a number of lines (or pixels) of first portion 116A have been (or remain to be) output by first display 110A, and an indication of a number of lines (or pixels) of second portion 116B that have been (or remain to be) output by second display 110B. In some examples, the display status may be referred to as to a horizontal synchronization (hsync) or vertical synchronization (vsyc) signal.

According to these techniques, host controller 115 may compare the respective display status from the first display 110A and the second display 110B to one another. For example, host controller 115 may determine a difference between number of sub-portions (e.g., lines) of the respective first portion 116A and second portion 116B of image 116 that have been presented, or that remain to be presented.

In response to the comparison, host controller 115 may communicate a display adjustment signal to at least one of the first display 110A and the second display 110B. The display adjustment may cause at least one of displays 110A, 110B to adjust presentation of one or more sub-portions (e.g., lines) of the first portion 116A or the second portion 116B. For example, the display adjustment signal may indicate an adjustment to when the one or more sub-portions are presented via the respective first or second display 110A, 110B. As one example, the display adjustment signal may be used by the display 110A, 110B, to adjust a time at which lines and/or pixels of an image (i.e., a frame) are presented via the display, relative to presentation of at least one previously displayed frame of an image. For example, based on the display adjustment signal, a display 110A, 110B as described herein may modify a duration between presentation of active sub-portions (e.g., lines, pixels) of sequentially displayed frames of first and/or second portions 116A, 116B (e.g., frames) of an image 116.

In some examples, a display device, such as smart displays 110A, 110B described herein, may be configured to, upon completion of presentation of frame (e.g., presenting a last line (or pixel) of a frame according to a scan arrangement of the display), delay for a some time before presenting a first line (or pixel) of a next frame of the image. In some examples, such a display device may define such a delay interval based on a time period defined by an amount of time to present a line (i.e., a vertical delay interval) and/or pixel (i.e., horizontal delay interval) via the display. For example, where the delay interval comprises a vertical delay interval, display may be configured to delay presentation of lines of an image based on a number of "blanking lines" associated with the frame, that define an amount of time to delay presentation of one or more active lines of the frame. According to another example, where the delay interval comprises a horizontal delay interval, a display may be configured to delay presentation of pixels of an image based on a number of "blanking pixels" associated with the frame. An indication of such blanking lines and/or pixels may or may not be stored in a memory or register of the display. For example, a display may be preprogrammed or programmable to define the number of blanking lines and/or blanking pixels, which the display may used to define a time period to delay between presentation of consecutive frames of an image. In other examples, an indication of such blanking lines and/or pixels may generated by the display and may be stored in a memory location and used by the display to delay presentation of active lines or pixels of a frame of an image, relative to presentation of a previous frame of the image.

According to the techniques described herein, a display device 110A, 110B depicted in FIG. 1 may be configured to adjust presentation of at least one sub-portion of a first or second image portion, by modifying a delay time between presentation of consecutive frames. For example, display device 110A, 110B may be configured to insert, or delete, a number of vertical blanking lines and/or horizontal blanking pixels associated with a frame, to cause a presentation time of the at least one sub-portion (e.g., line or pixel) of the frame to be adjusted. In some examples, once the display device 110A, 110B has operated to output the frame with the adjusted blanking lines and/or pixels, the display device may return to a previously used delay (e.g, a previously used number of vertical blanking lines and/or horizontal blanking pixels) for a next frame of an image portion to be presented by the display 110A, 110B. In this manner, by adjusting the presentation time of at least one frame (e.g., at least one sub-portion of the frame) of an image portion by adding or deleting blanking lines and/or pixels, the host controller 115 may be configured to, synchronize operation of displays 110A, 110B to present respective first and second portions 116A, 116B of an image 116. According to these techniques, the host controller 115 may operate to synchronize presentation of image 116 split among the displays 110A, 110B, without using more complex techniques to synchronize internal clock references of the displays 110A, 110B. Also according to the techniques described herein, instead of host controller 115 issuing a single command to one or more of displays 110A, 110B to add or delete one or more blanking lines and/or pixels, host controller 115 may issue a sequence of such commands associated with one or more different frames of a displayed image portion 116A, 116B, in order to gradually synchronize the plurality of displays 110A, 110B to present the respective image portions 116A, 116B.

According to these examples, to adjust a presentation time of the at least one sub-portion of a first or second portion 116A, 116B of an image 116, as described herein, host controller 115 may receive one or more of hsynch and vsynch signals from the respective displays 110A, 110B, and send one or more of displays 110A, 110B an display adjustment signal, which may be used by the respective display 110A, 110B to insert or delete one or more blanking lines and/or pixels, to thereby cause an adjustment to presentation of the at least one sub-portion (e.g., relative to a previously displayed frame).

The techniques described herein may be advantageous for a number of reasons. For example, host controller 115 may control displays 110A and 110B to output respective first 116A and second 116B portions of an image 116 without additional circuitry or software (e.g., PLL, DLL, other clock synchronization components) to directly synchronize one or more clock sources of first display 110A and second display 110B as described above.

Figure 2:
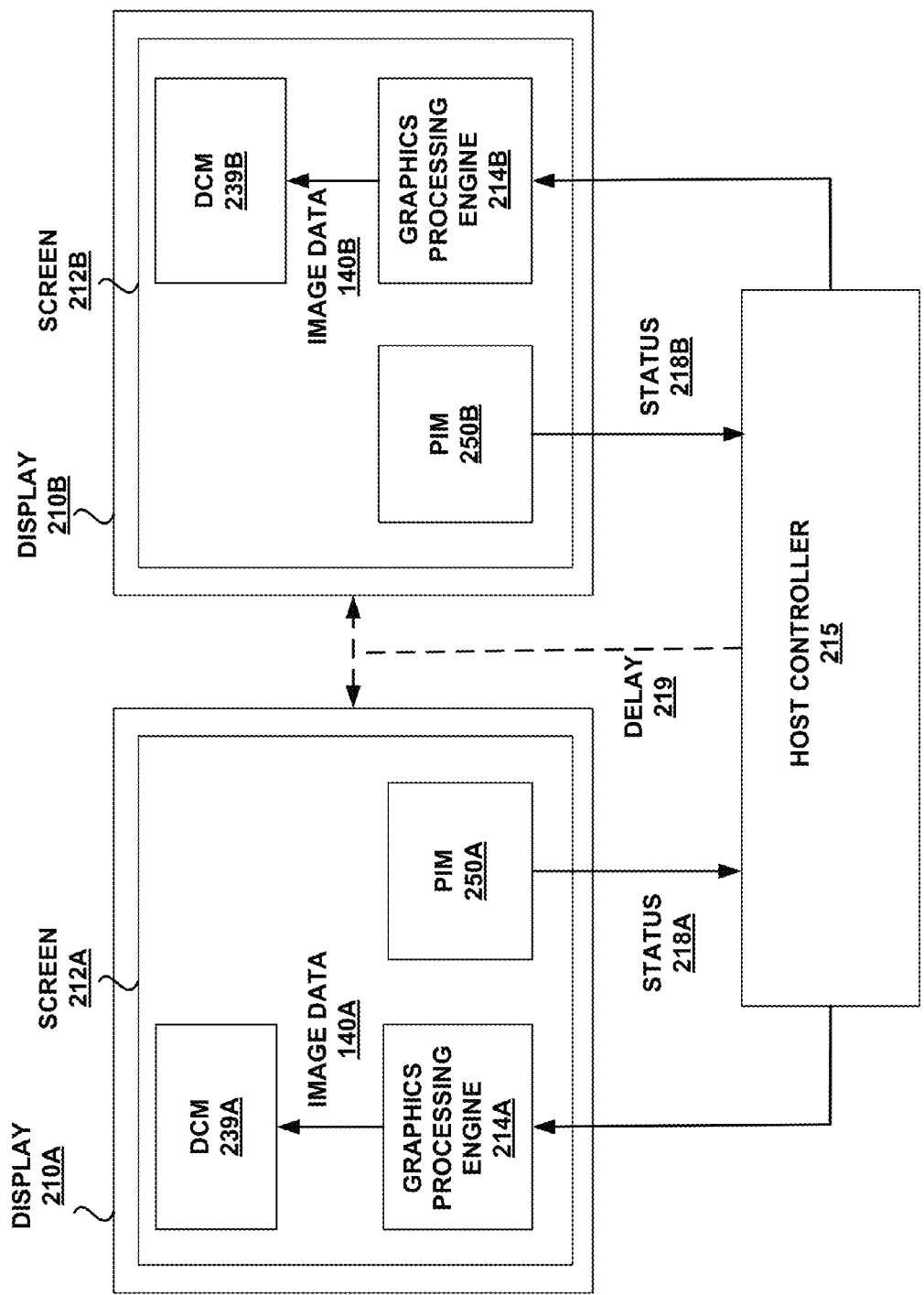
FIG. 2 is a block diagram that illustrates an example of a host controller operable to control presentation of an image split across multiple displays consistent with the techniques of this disclosure.

FIG. 2 is a block diagram that illustrates one example of a host controller 215 configured to control the presentation of an image (not depicted in FIG. 2) split among a first display 210A and a second display 210B consistent with the techniques of this disclosure. As depicted in FIG. 2, each of displays 210A, 210B may include a processing engine 214A, 214B, respectively. Each of displays 210A, 210B may be referred to as a smart display as described above. Processing engines 214A, 214B may comprise any combination of hardware or software configured to receive instructions and/or data from host controller 215 and process received instructions and/or data to generate image data 240A, 240B to be presented via screens 212A, 212B of the respective displays 210A, 210B.

As depicted in FIG. 2, each of displays 210A, 210B include a display control module (DCM) 239A, 239B. Display control modules 239A, 239B may receive processed image data 240A, 240B (e.g., via a frame buffer, not depicted in FIG. 2) and control respective screens 212A, 212B to present images. In some examples, image data 240A, 240B may be received from host controller 215. In other examples, image data 240A, 240B may comprise image data generated by respective processing engines 214A, 214B based on "graphics instructions received by displays 210A, 210B. In each case, image data 240A, 240B may be pixel data defining at least a portion of an image to be displayed by displays 210A, 210B.

As also depicted in FIG. 2, each of displays 210A, 210B includes a progress identification module (PIM) 250A, 250B. PIM 250A, 250B may each determine a status of the respective display 210A, 210B to present respective portions of an image (e.g., first portion 116A, second portions 116B as depicted in FIG. 1). For example, each PIM 250A, 250B may determine a number of sub-portions (e.g., lines, pixels) of respective first and second portions of an image that have been presented via the respective displays 210A, 210B. Each PIM 250A, 250B may communicate, to host controller 215, a display status 218A, 218B that indicates a status of the respective displays 210A, 210B to present the respective first and second portions of an image.

Host controller 215 may receive at least a first display status 218A and a second display status 218B from at least two displays 210A, 210B. Host controller 215 may compare the received display status 218A, 218B to one another, and determine a difference between the first and second displays 210A, 210B to present respective image portions based on the comparison. In some examples, if a difference exists between received display states 218A, 218B, host controller 215 may communicate to at least one of displays 210A, 210B a display adjustment 219 that controls at least one of the displays 210A, 210B to adjust presentation of a respective portion of an image. For example, display adjustment 219 may cause at least one of displays 210A, 210B to adjust presentation of at least one sub-portion (e.g., line or pixel) of a respective portion of an image. For example, the display adjustment 219 may be configured to cause the display 210A, 210B to adjust a time period between presentation of the at least one sub-portion and a previously presented image frame.

Figure 3:
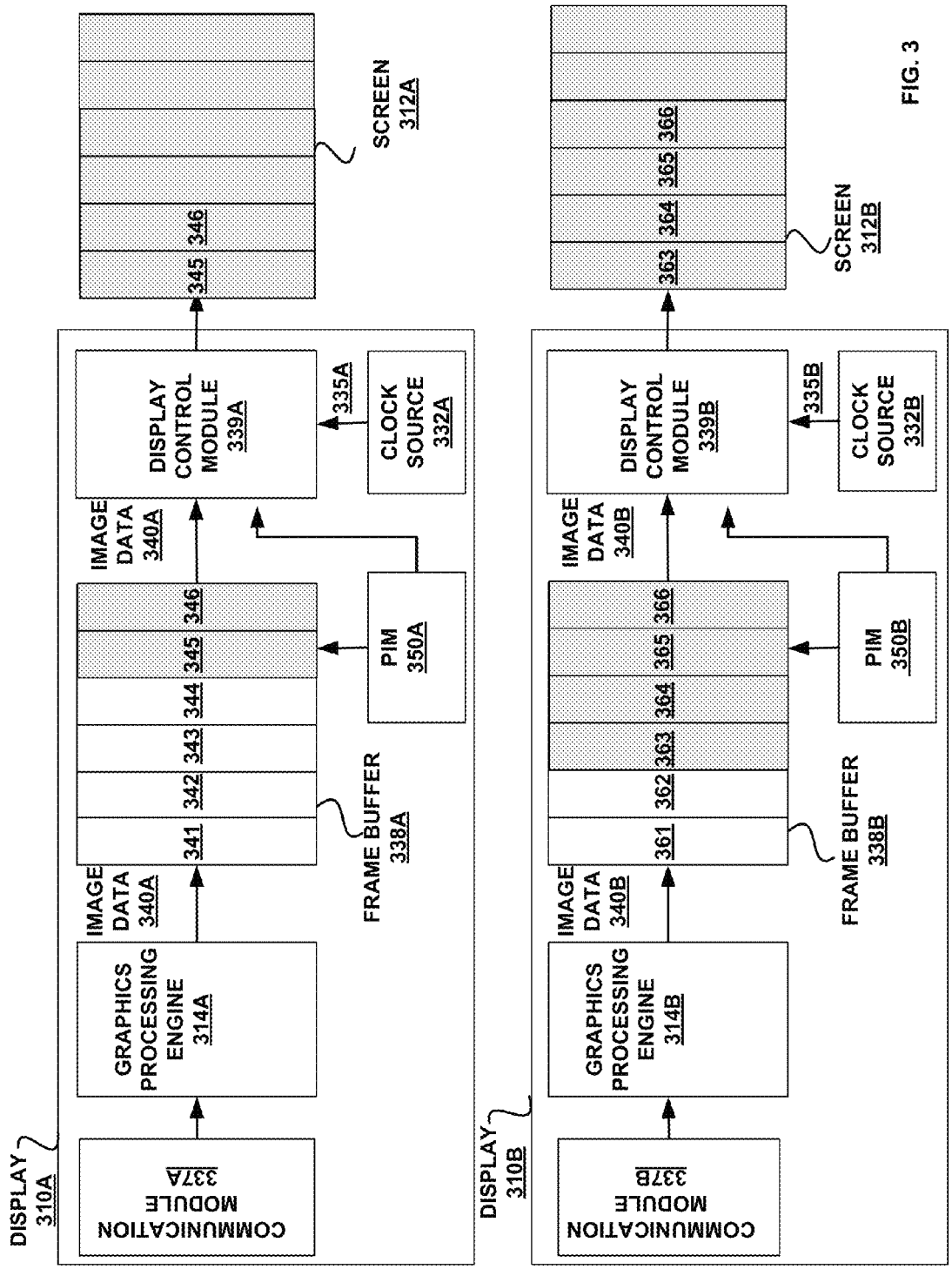
FIG. 3 is a block diagram that illustrates an example of multiple display devices consistent with the techniques of this disclosure.

FIG. 3 illustrates one non-limiting example of multiple displays 310A, 310B configured to present an image split across the multiple displays consistent with the techniques of this disclosure. Respective features are depicted in FIG. 3 with respective A and B designators such as displays 310A, 310B and graphics processing engines 314A, 314B. These respective features of FIG. 3 are referred to herein collectively without the respective A and B designators depicted in FIG. 3 to describe aspects shared among the respective "A" and "B" designated features. For example, displays 310A, 310B are referred to collectively as "display 310". As another example, graphics processing engines 314A, 314B are referred to collectively as "graphics processing engines 314." As another example, image data 340A, 340B, are referred to collectively as "image data 340."

Generally speaking, graphics processing engine may be configured to process received image data and/or graphics instructions received by display 310 (e.g., from host controller 115 illustrated in FIG. 1), and output image data 340.

As depicted in FIG. 3, graphics processing engine 314 also includes a frame buffer 338. Frame buffer 338 may comprise any computer readable storage medium configured to temporarily or permanently store image data 340 (e.g., pixel information) for presentation. For example, frame buffer 338 may comprise any type of storage components, such as a random access memory (RAM), Flash memory, magnetic hard disc memory, or any other type of component configured to store data, such as image date 340. In some examples, graphics processing engine 314 may process graphics instructions and output processed image data 340 to frame buffer 338.

Display control module 339 may be configured to access image data 340 stored in frame buffer 338 and control display 310 to present images based on image data 340 in some implementations display control module may be a part of the graphics processing engine 314. In some examples graphics processing engine may also include a graphics processing unit (GPU).

Display 310 may comprise a liquid crystal display (LCD), a plasma display, a rear-projection display, a projector display, a cathode ray tube display, or any other type of display. For example, a liquid crystal display or plasma display may include a plurality of display elements (not depicted in FIG. 3) presented at a screen of the display. Each display element may be configured to emit (or not emit) light, and/or emit light of different color or other characteristic. Display control module 339 may control such display elements based on image data 340. For example, display control module 339 may, based on image data 340 that indicates a particular pixel of an image has a red color, cause one or more display elements representing such a pixel to emit red light.

As also depicted in FIG. 3, display 310 includes clock source 332. Clock source 332 may include one or more components configured to generate a reference clock 335, such as a crystal oscillator or other hardware and/or software component configured to generate a reference clock 335. One or more other components of display 310, such as graphics processing engine 314, frame buffer 338, and or display control module 339 may operate based on a generated reference clock 335. For example, display control module 339 may control display 310 to present respective sub-portions (e.g., lines) of an images based on a reference clock generated by clock source 332.

According to some examples, display control module 339 may read out image data 340 stored in frame buffer 338 based on reference clock 335 for presentation via display screen 312. For example, display control module 339 may read out sub-portions of (e.g., lines) of image data 340 stored in frame buffer 338 at time intervals defined based on reference clock 335. Such sub-portions of image data 340 may correspond to one or more sub-portions of a displayed portion of an image (e.g., lines of a first or second portion of an image).

As depicted with respect to display 310A of FIG. 3, frame buffer 338A includes image data 340A including sub-portions 341-346 that correspond to lines of a first portion (e.g., corresponding to first image portion 116A as illustrated in FIG. 1) of an image presented via screen 312A. Sub-portions 341-346 may correspond to a frame of an image portion (e.g., a frame of a sequence of frames, such as a video sequence). As depicted in FIG. 3, sub-portions 345 and 346 of the first portion have been read out from frame buffer 338A and presented via screen 312A. As also depicted in FIG. 3, sub-portions 341-344 of the first portion are yet to be read out of frame buffer 339A and presented via screen 312A. FIG. 3 also shows a number of sub-portions (not labeled in FIG. 3) that have been presented via screen 312A before sub-portions 345 and 346. Such sub-portions may, for example, comprise sub-portions of same or another frame of an image portion (e.g., a frame that has previously been read out of frame buffer by display control module 339A).

As depicted with respect to display 310B of FIG. 3, frame buffer 338B includes image data 340B including sub-portions 361-366 that correspond to lines of a second portion (e.g., second portion 116B as illustrated in FIG. 1) of an image presented via screen 312B. Sub-portions 361-366 may correspond to a frame of an image portion (e.g., a frame of a sequence of frames, such as a video sequence). As depicted in FIG. 3, sub-portions 363-366 of the second portion have been read out from frame buffer 338B and presented via screen 312B. As also depicted in FIG. 3, sub-portions 361-362 of the second portion of are yet to be read out of frame buffer 339B and presented via screen 312B. FIG. 3 also shows a number of sub-portions (not labeled in FIG. 3) that have been presented via screen 312B before sub-portions 363-366. Such sub-portions may, for example, comprise sub-portions of same or another frame of an image portion (e.g., a frame that has previously been read out of frame buffer by display control module 339B).

Each frame buffers 339A, 339B of displays 310A, 310B depicted in FIG. 3 include respective image portions that each include a total of six lines (e.g., lines 341-346, lines 361-366, respectively). The example of FIG. 3 is provided for purposes of explaining the techniques of this disclosure. In some examples, an image or image portion to be displayed as described herein may include many more lines of image data 340 and corresponding screen output than depicted in FIG. 3. For example, an image configured to be presented by a high definition display may include 720 or 1080 lines, or any other number of lines, of image data 340.

According to the example of FIG. 3, display 310A has presented two lines 345-346 of a first portion of an image (e.g., first portion 116A depicted in FIG. 1), while display 310B has presented four lines 363-366 of a second portion 316B (e.g., second portion 1156B depicted in FIG. 1). As such, operation of displays 310A and 310B to output respective first portion 316A and second portion 316B is not synchronized. In some examples, a lack of synchronization between operation of displays 310A and 310B as illustrated in FIG. 2 may be caused by differences in clock signals 335A, 335B from respective clock sources 332A, 332B of displays 310A and 310B.

As depicted in FIG. 3, according to the techniques of this disclosure, each of displays 310A, 310B includes a progress identification module PIM 350A, 350B (collectively PIM 350). PIM 350 may determine a status of display 310 to output a portion of an image. For example, PIM 350 may monitor operation of display control module 339 and/or frame buffer 338 to determine a status of display 310 to output a portion of an image.

PIM 350 may determine a progress of display 310 to present one or more sub-portions (e.g., lines or pixels) of an image portion. For example, PIM 350 may monitor operation display control module 339 to present sub-portions of an image portion, such as a number of lines or pixels of an image portion that have been read out of frame buffer and presented by display control module 339. For example, PIM 350A of display 310A may monitor display control module 339A to determine that two lines 345-346 have been read out of frame buffer 338 and presented via screen 312A. PIM 350B of display 310B may monitor display control module 339B to determine that four lines 363-366 have been read out of frame buffer 339 and presented via screen 312B.

According to other examples, PIM 350 may not directly monitor operation of display control module 339. According to these examples, PIM 350 may determine a status of display 310 to output one or more sub-portions of an image based on determining an amount of available and/or consumed space of frame buffer 338. For example, PIM 350 may determine a location of a pointer or other reference marker that indicates a position of a current frame to be read out from frame buffer 338 and presented via screen 312.

As another example an available storage size of frame buffer 338 may represent a particular number of lines (e.g., 1080 lines) or pixels of an image to be presented. According to this example, PIM 350 may determine an amount of available storage space consumed by image data 340 stored in frame buffer 338, and thereby determine a progress of display 310 to present sub-portions (e.g., a number of lines or pixels) of an image. For example, as depicted in FIG. 3, PIM 350A of display 310A may monitor frame buffer 338A to determine that two lines 345-346 of a first portion of an image have been read out of frame buffer 338A and presented via screen 312A. PIM 350B of display 310B may monitor frame buffer 338A to determine that four lines 363-366 of a second portion of the image have been read out of frame buffer 339 and presented via screen 312B.

In some examples, PIM 350 may generate, based on monitoring display 310 to determine progress of display 310 to present sub-portions (e.g., lines) of an image portion, PIM 350 may generate a display status (e.g., display status 218A, 218B as depicted in FIG. 2) that indicates to a host controller (e.g., host controller 215 depicted in FIG. 2), progress of display 310 to present one or more sub-portions of an image portion. For example, PIM 350 may generate a display status (not depicted in FIG. 3) that indicates a progress of display 310 to output frames of an image portion (e.g., a number of lines and/or of an image portion that have been presented via a display screen 312). PIM 350 may generate and/or communicate display status continuously (e.g., with each clock cycle of reference clock 335, with respect to storing/reading sub-portions of image data to/from frame buffer 339, new frame of image portion stored in frame buffer 339), and/or based on one or more predetermined time intervals.

In some examples, PIM 350 may generate a display status that comprises a vsynch signal and/or an hsynch signal as described above. For example, a display 310 as described herein may be configured to delay presentation of active sub-portions of an image stored in frame buffer 338 for a time interval after presentation of a previous frame of an image. Such a time interval may be based on one or more blanking regions of a frame, that include a number of vertical blanking lines and/or horizontal blanking pixels. In some examples, the horizontal blanking region may include an hsynch region (i.e., an hsynch signal), which may indicate at least a portion of a time period for which the display delays presentation of pixels of the frame with respect to a previously displayed frame of an image portion. The vertical blanking region may include a vsynch region (i.e., an vsynch signal), which may indicate at least a portion of a time period for which the display delays presentation of lines of an frame with respect to a previously displayed frame of an image portion. According to these examples, PIM 350 may generate a display status 218A, 218B that comprises a vsynch signal, an hsynch signal, or both a vsynch signal and an hsynch signal as described above.

In some examples, PIM 350 may output an indication of a progress of a display 310 to output sub-portions (e.g., lines and/or pixels) of an image portion continuously, such as for each clock cycle of reference clock 335A, or for each sub-portion of image data 340 stored in or read out of frame buffer 338. In other examples, PIM 350 may operated to output an indication of a progress of display 310 to output sub-portions each time a new image portion (e.g., new frame of a video sequence) is stored in frame buffer 338 (or read out from frame buffer 338). In still other examples, PIM 350 may output an indication of the progress of display 310 according to a predetermined time interval. For example, PIM 350 may operate to determine a progress of display 310 every five sub-portions of image data 340 stored in or read out of frame buffer 338, or every twenty clock cycles of reference clock 335A. In some examples, PIM 350 may include a counter (not shown in FIG. 3) configured to count a status of display 310 to present image data. For example, such a counter may be updated each time a sub-portion of image data 340 is stored in (or read out from) frame buffer 338.

Referring back to FIG. 2, host controller 215 may control multiple displays 210A, 210B to display an image split across the multiple displays 210A, 210B. According to the techniques of this disclosure, each of displays 210A, 210B includes a progress identification module (PIM) 250A, 250B as described above with respect to PIM 350A, 350B depicted in FIG. 3. PIMs 250A, 250B may each, for the respective displays 210A, 210B, determine a progress of the respective display to output one or more sub-portions of respective first and second image portions 216A, 216B, and communicate a display status signal 218A, 218B (e.g., vsynch and/or hsynch signals) that indicates a progress of the respective display to present respective sub-portions of the first and second image portions 216A, 216B. According to the techniques of this disclosure, host controller 215 may receive the display status signals 218A, 218B and, in response, generate at least one display adjustment signal 219 configured to cause one or more of the first and second displays 210A, 210B to adjust presentation of at least one sub-portion (e.g., at least one line and/or pixel) of a first image portion and/or second image portion (e.g., first image portion 116A, second image portion 116B as depicted in FIG. 1) to be presented by the respective displays 210A, 210B.

Figure 4:
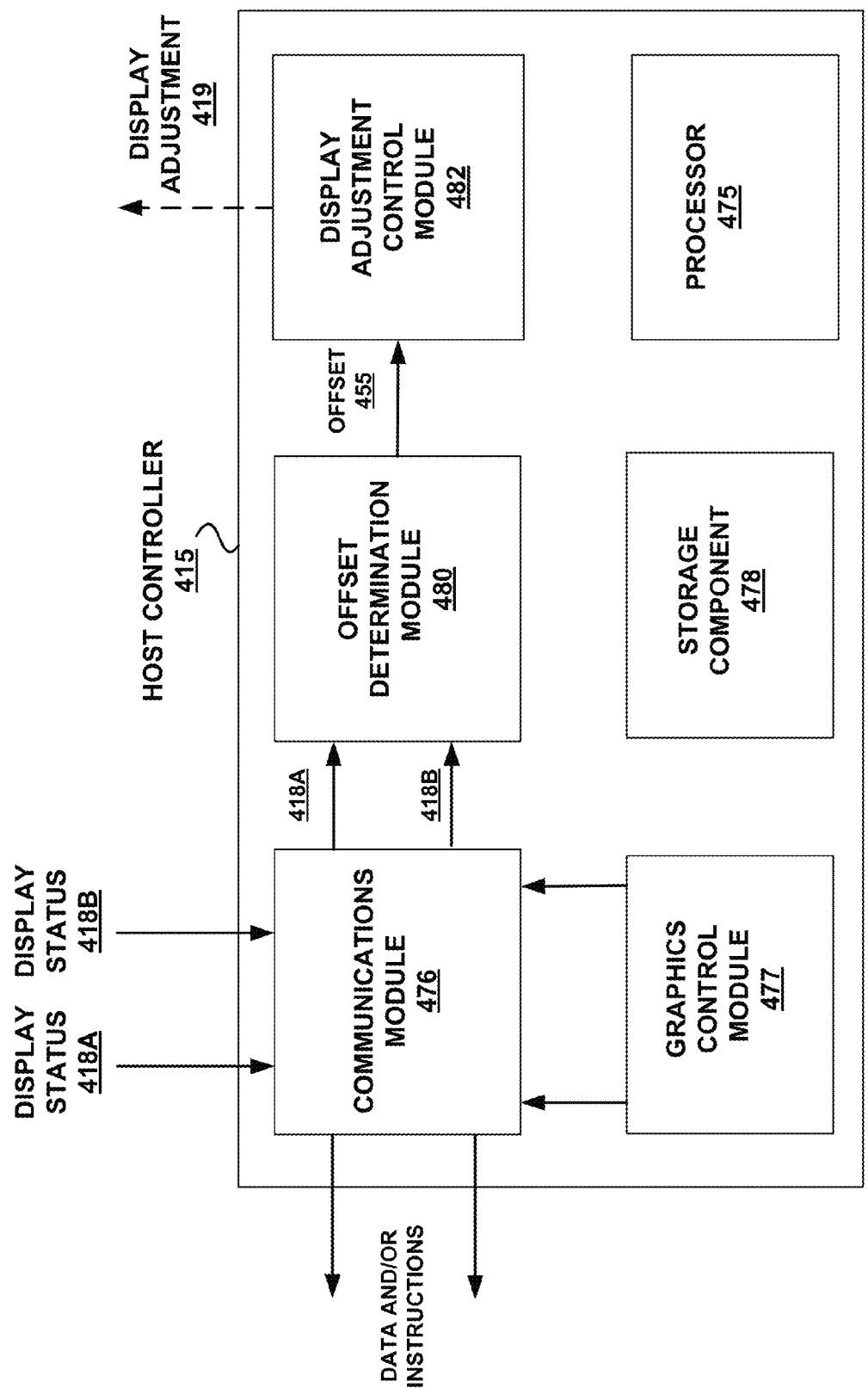
FIG. 4 is a block diagram that illustrates an example of a host controller configured to control presentation of an image split across multiple displays consistent with the techniques of this disclosure.

FIG. 4 is a block diagram that illustrates one example of a host controller 415. Host controller 415 may comprise any device configured to control multiple displays (e.g., displays 210A, 210B illustrated in FIG. 2) simultaneously. For example, host controller 415 may comprise any device communicatively coupled to at least two displays and configured to control multiple displays to present at least one image split across the multiple displays. In some examples, host controller 415 may comprise a computing device such as a desktop computer, gaming console, laptop computer, smart phone, feature phone, or tablet computer, digital media player, or any other device configured to control multiple displays to present an image split across the multiple displays.

As depicted in FIG. 4, host controller 415 may include at least one processor 475. Processor 475 may include any component configured to process program instructions. For example, processor 475 may include one or more central processing units (CPUs), graphics processing units (GPUs), application specific integrated circuits (ASICs), field programmable gate arrays (FPGAs), or any other component configured to process instructions. Processor 475 may execute program instructions to cause host controller 415 to operate consistent with the techniques described herein.

As also depicted in FIG. 4, host controller 415 includes a communication module 476. Communication module 476 may enable host controller 475 to communicate with multiple displays (e.g., displays 210A, 210B depicted in FIG. 2) and/or other computing devices. For example, communications module 476 may be configured to enable wired (e.g., Ethernet, digital video input (DVI®), high-definition multimedia interface HDMI®), or wireless (Wi-Fi®, cellular network, Bluetooth®) communications between host controller 575 and multiple displays and/or other computing devices.

As also depicted in FIG. 4, host controller 415 further includes at least one storage component 478. Storage component 478 may comprise any component configured to store data and/or executable instructions, e.g., instructions executable by processor 475 to cause host controller to operate consistent with the techniques of this disclosure. For example, storage component 478 may comprise any type of storage component, including but not limited to random access memory (RAM), Flash memory, magnetic hard disc memory, optical memory, or any other type of component configured to store data or instructions, temporarily or long-term.

As depicted in FIG. 4, host controller 415 also includes a graphics control module 477. In some examples, graphics control module 477 may communicate instructions and/or data related to images for display, such as image data and/or graphics instructions interpretable by respective graphics processing modules (e.g., graphics processing engines 314A, 314B illustrated in FIG. 3) of multiple displays (e.g., displays 310A, 310B illustrated in FIG. 3 In some examples, image data and/or graphics instructions 417A communicated to a first display may differ from image data and/or graphics instructions 417B communicated to a second display as described herein. However, in other examples, at least some of image data and/or graphics instructions may be the same as at least some of image data and/or graphics instructions.

In some examples, graphics control module 477 may comprise instructions executable by processor 475, such as an application executing on processor 475 that generates and communicates instructions and/or data to multiple displays. For example, such an application may generate and communicate image data and/or graphics instructions in response to user input, or input received from another computing device (not depicted in FIG. 4). According to other examples, graphics control module 477 may comprise software and/or hardware of host controller 415 configured to communicate image data and/or graphics instructions stored in a memory component of host controller 415, or received from another computing device communicatively coupled to host controller 415 (e.g., streamed image data).

As shown in FIG. 4, host controller 415 includes an offset determination module (ODM) 480. As depicted in FIG. 4, ODM 480 may receive (e.g., via communications module 476 as depicted in FIG. 4), from first and second displays (e.g., displays 210A, 210B depicted in FIG. 2) communicatively coupled to host controller 475, a display status 418A, 418B for each of the multiple displays. The received display status 418A, 418B may each, as described above, indicate a progress of the respective first and second displays to present respective portions of an image. For example, the display status 418A, 418B may indicate a timing of output of the respective portions of the image. According to another example, the display status may indicate a number of sub-portions (e.g., a number of lines and/or pixels) of respective first and second portions (e.g., first portion 116A, second portion 116B of image 116 as depicted in FIG. 1) of an image split across multiple displays that have been output by the respective displays. In some examples, as described above with respect to FIG. 3, the display status 418A, 418B may include a vsynch signal and/or an hsynch signal associated with at least one frame of the first portion 116A or the second portion 116B of the image 116.

In some examples, ODM 480 may compare the received first and second display status 418A, 418B to one another to determine an offset 455 between the first and second displays. For example, based on first and second display status 418A, 418B, ODM 480 may compare the number of lines presented by the first display to the number of lines presented by the second display, and thereby determine a difference, e.g., as a measure of the degree to which the first and second displays are out of synchronization with one another. For example, ODM 480 may determine, based on display status 418A, 418B that comprises one or more of an hsynch signal and/or a vsynch signal as described herein, a delay associated with presentation of respective first and second displays to present respective first and second image portions, and thereby determine, based on the display status 418A, 418B, a difference in operation of the respective displays to present the first and second portions of the image. Based on the display status 418A, 418B, ODM 480 may generate an offset 455 that indicates such a determined difference.

As also depicted in FIG. 4, host controller 415 further includes adjustment control module 482. Adjustment control module 482 may receive, from ODM 480, a determined offset 455. Based on the determined offset 455, adjustment control module 482 may or may not communicate a display adjustment 419 to at least one of the multiple displays.

According to one example, adjustment control module 482 may communicate a display adjustment 419 to at least one of the multiple displays based on whether or not offset 455 is determined between the multiple displays. In other examples, adjustment control module 482 may be configured to communicate a display adjustment 419 based on comparison of a determined offset 455 to a predetermined threshold. Such a predetermined threshold may indicate, for example, time difference between operation of the multiple displays to present respective portions of an image, or a number of lines difference between operation of multiple displays to present one or more sub-portions of respective portions of an image presented by the multiple displays. Such a predetermined threshold may, in some examples, be based on time period and/or number of sub-portions for which a lack of synchronization among multiple displays may cause undesirable effects in the display of first and second portions of an image. As one such example, such a predetermined threshold may indicate a difference of five lines. According to this example, adjustment control module 482 may communicate a display adjustment 419 to at least one of multiple displays if a determined offset 455 is equal to or greater than five lines.

In other examples, adjustment control module 482 may be additionally configured to communicate a reset based on a determined offset 455. For example, adjustment control module 482 may compare a received offset 455 to a reset threshold that indicates a number of sub-portions (e.g., lines) of offset for which adjusting presentation of one or more sub-portions of an image portion may not be sufficient to synchronize multiple displays presenting an image split across the multiple displays. For example, adjustment control module 482 may communicate a reset configured to cause the multiple displays to reset one or more clock generation components of the respective display to an initialization state. According to other example, the reset module may cause one or more of the multiple displays to clear a frame buffer and begin presenting respective image portions at a common time. In particular, if there are two displays, adjustment control module 482 may cause each display to reset and clear its frame buffer, such that both displays starting displaying again at the same time. For example, display adjustment module 482 may communicate a reset configured to cause the respective displays to reload a current frame into the respective frame buffers of the display, or to cause the respective displays to clear a current frame and load image data corresponding to a next frame of a video sequence.

TABLE 1

Example display adjustment

| D7 | D6 | D5 | D4 | D3 | D2 | D1 | D0 |
|---|---|---|---|---|---|---|---|
| Reset | Direction | | Blanking Lines to Shift | | | | Frame to apply |

Table 1 above illustrates one non-limiting example of a display adjustment 419 that may be communicated by an adjustment control module 482 in response to a determined offset 455. According to the example of Table 1, the display adjustment 419 command includes 8 bits of data. A first bit, D0, indicates which frame of a plurality of frames (e.g., of first portion 116A of image 116, where image 116 comprises a video sequence) for which to apply a shift (e.g., adjust a number of blanking lines). According to this example, a value of 0 may indicate that a display should apply display adjustment 419 to a next frame of a portion of an image. Also according to this example, a value of 1 may indicate that the display should apply display adjustment 419 to frame after a next frame of the portion of the image. According to these examples, adjustment control module 482 of host controller 415 may determine whether to apply a display adjustment to a next or further frame of an image portion, based on a status of the display to output a current frame. For example, adjustment control module 482 may determine whether to apply the display adjustment to a next frame, if there is enough time for the display to process the display adjustment and apply the display adjustment to the next frame. However, if there is not sufficient time to apply the display adjustment to the next frame, adjustment control module 482 may apply the display adjustment to a further frame after the next frame.

According to the example of Table 1, the second through sixth bits D1-D5 of display adjustment 419 indicate a number of blanking lines and/or pixels associated with a frame of image data to add or delete. According to this example, display adjustment 419 may indicate from 1-32 blanking lines to add or delete. Also according to the example of Table 1, a seventh bit D6 of display adjustment 419 comprises a direction. The direction may indicate whether or not to add (increase a delay for presenting active lines of a frame) or to delete (e.g., reduce a delay for presenting active lines of the frame lines) a number of blanking lines and/or pixels indicated by bits D1-D5. According to the example of Table 1, if bit D6 is assigned a value of 1, a display may add a number of blanking lines indicated by bits D1-D5. If bit D6 is assigned a value of 0, a display may delete a number of blanking lines indicated by bits D1-D5.

In some examples, host controller 315 may be configured to communicate a display adjustment, such as depicted in Table 1 above, to adjust presentation of active lines and/or pixel data for a plurality of different frames of image data. For example, host controller may be configured to communicate display adjustment of less than a predetermined threshold, e.g., 32 lines or less. According to these examples, host controller 315 may communicate a plurality of display adjustment signals associated with a plurality of frames of image data, to gradually synchronize a plurality of displays as described herein.

Also according to the example of Table 1, an 8th bit D7 of display adjustment 419 indicates a reset. The reset may instruct a display to reset one or more clock generation components of the display. For example, if bit D7 has a value of 1, a display may reset presentation of an image at a current or future frame. However, if bit D7 has a value of 0, a display may operate to add or delete a number of blanking lines and/or pixels associated with at least one frame of an image according to a number of lines, direction, and/or according to a frame indicated by bits D0-D6.

Referring back to the example of FIG. 3, first display 310A has operated to present lines 345-346 via screen 310A, and second display 310B has operated to present lines 363-366 via screen 312B. According to this example, host controller 415 (e.g., ODM 480) may receive a display status 418A, 418B from each of a plurality of displays (e.g., from PIM 350A, 350B of displays 310A, 310B depicted in FIG. 3). ODM 482 may compare received display status 418A, 418B to one another to determine an offset 455 between operation of the respective displays. According to the example of FIG. 3 ODM 480 may determine an offset of two lines between operation of displays 310A and 310B, because display 310B has presented two more lines of a second image than display 310A has presented of a first image.

Display adjustment control module 482 may communicate a display adjustment 419 to second display 310B. In one example, adjustment control module 482 may communicate display adjustment 419 based on whether a determined offset 455 exists (e.g., offset 455 is greater than 0). In other examples, adjustment control module 482 may compare a determined offset 455 to a predetermined threshold to determine whether to communicate display adjustment 419. According to the example of FIG. 3, where a determined offset 455 is two lines, if the predetermined threshold is one line, adjustment control module 482 may communicate a display adjustment 419 based on a determined offset of two lines. However, if the predetermined threshold is three lines or greater, adjustment control module 482 may not communicate a delay based on a determined offset 455 of two lines.

In one example, a display adjustment 419 may cause second display 310B to delay output of further lines of a second portion (e.g., second portion 110B of FIG. 1) of an image. For example, according to the example of FIG. 3, display adjustment 419 may cause one or more blanking lines associated with data stored in frame buffer 339B (i.e., associated with a next frame) to be added, such that, for example, lines and/or pixels of image data stored in frame buffer 339B are delayed longer between presentation of a current frame and a next frame. According to this example, the display adjustment may cause lines and/or pixels of respective image portions to be presented at substantially the same time, thereby synchronizing operation of displays 110A, 110B to present respective portions of an image split across displays 110A, 110B. In some examples, the display adjustment (i.e. extra/deleted blanking lines) may be performed only once (i.e. applied on one consecutive frame only for example) after issuing every display adjustment 419, and after that the display timing will return to operate using a standard number of blanking lines and/or pixels.

In another example, a display adjustment 419 may cause second display 310A to reduce a delay of lines and/or pixels of a first portion (e.g., first portion 110A of FIG. 1) of an image with respect to at least one previous frame of the first portion of the image. For example, also according to the example of FIG. 3, display adjustment 419 may cause lines one or more lines and/or pixels of blanking data associated with a frame to be deleted, such that, for example, a delay of presentation of lines of the second portion of the image is shorter than for at least one previous frame. According to this example, display adjustment 419 may cause lines 342 and 362 of at least one subsequent frame to be presented at substantially the same time, thereby synchronizing operation of displays 110A, 110B to present respective portions of an image split across displays 110A, 110B.

In still another example, adjustment control module 482 may be configured to communicate a plurality of display adjustments. For example, according to the example of FIG. 3, adjustment control module 418 may communicate a first display adjustment that causes display 110A to delete one blanking line and/or pixel, and a second display adjustment that causes display 110B add one blanking line and/or pixel. According to this example, presentation of line 342 for at least one subsequent frame is moved forward and thus synchronized with line 362, which has been delayed. According to this example, display adjustment 419 may cause lines 342 and 362 to be presented at substantially the same time, thereby synchronizing operation of displays 110A, 110B to present respective portions of an image split across displays 110A, 110B.

The techniques described herein for presenting an image split across multiple displays may be advantageous for a number of reasons. For example, the techniques of this disclosure provide for the synchronization of first and second image portions across displays 310A, 310B, without synchronizing reference clocks 335A and 335B to one another. As such, according to these techniques, respective portions of an image may be split across multiple displays without complex, costly, and/or difficult to implement clock synchronization components or techniques.

The example of FIG. 3 described above includes two displays 310A, 310B operative to present respective portions (e.g., first portion 116A, second portions 116B depicted in FIG. 1) of an image (e.g., image 116). In other examples, host controller 415 may be operative to control display of an image split across more than two displays. According to one example where host controller is operative to control display of an image split across three displays, ODM 480 may receive three display status 418 instead of two (418A, 418B) as depicted in FIG. 4. According to this example, ODM 480 may compare each of the received display status 418 to one another. ODM 480 may designate one of the three displays as a reference. ODM 480 may determine an offset 455 for each other display in relation to the reference display. According to this example, adjustment control module 482 may communicate more than one display adjustment 419, to adjust operation of one or more of the displays as described above. According to this example, host controller 215 may operate to present an image split across more than two displays in synchronization.

In the examples depicted in FIGS. 1, 2 discussed above, host controller 215, 415 is depicted as a device separate from displays 110A, 110B, 210A, 210B. In other examples, one or more of displays may themselves be configured to operate as a host controller as described above.

Figure 5:
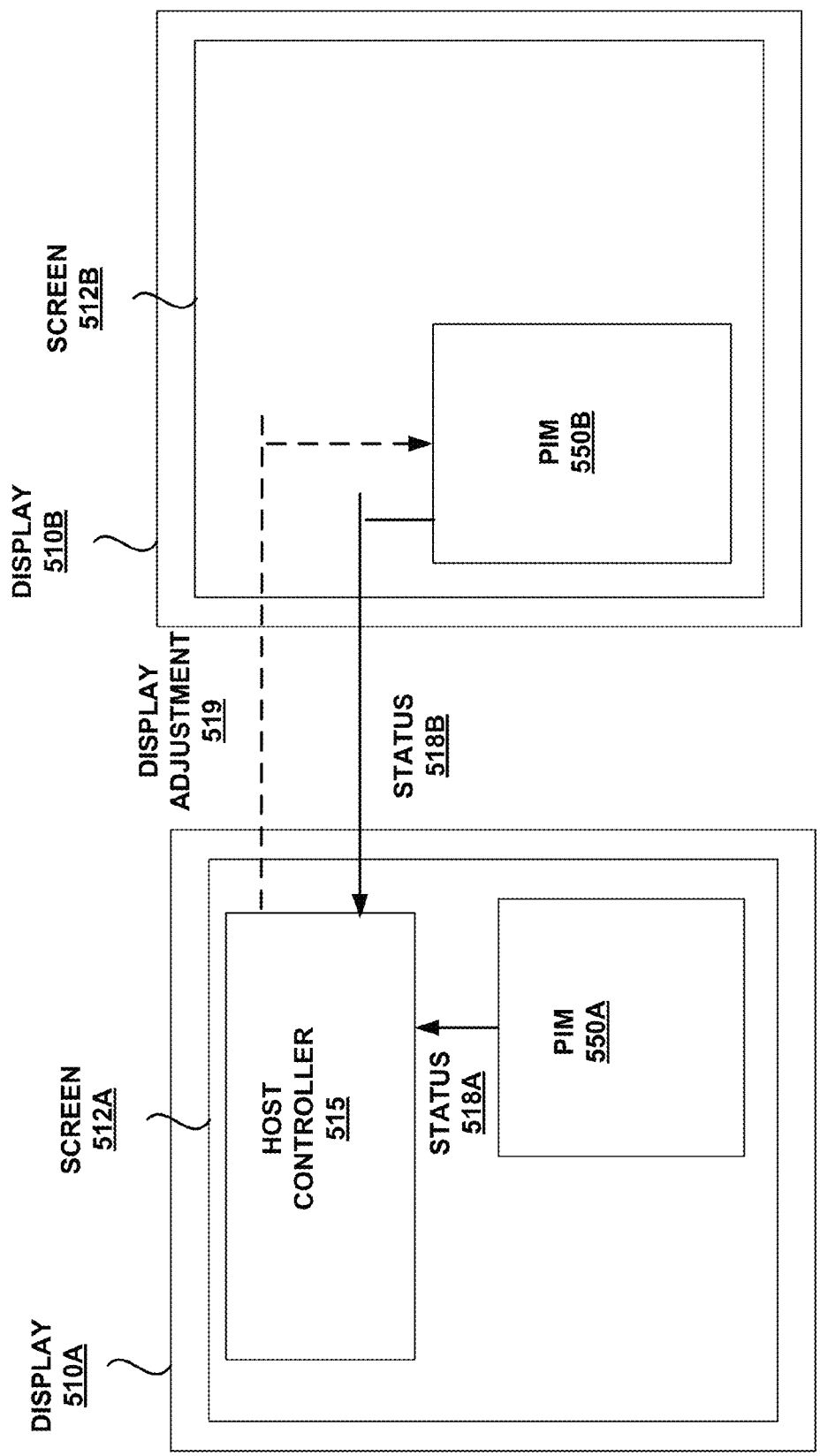
FIG. 5 is a block diagram that illustrates an example of a display that includes a host controller consistent with the techniques of this disclosure.

FIG. 5 is a block diagram that illustrates one example of a host controller 515 operable to control the presentation of a display across multiple displays 510A, 510B, where at least one of the multiple displays includes the host controller 515, consistent with the techniques of this disclosure. In the example of FIG. 5, display 510A includes host controller 515. Host controller 515 depicted in FIG. 5 may comprise software instructions executable by one or more processors (e.g., a GPU, CPU, not depicted in FIG. 5) of display 510A and/or one or more other hardware components. Similar to host controller 215 depicted in FIG. 2, host controller 515 of first display 510A may be configured to output image data and/or graphics instructions as described above to control the presentation of an image split across displays 510A, 510B via screens 512A, 512B.

As depicted in FIG. 5, host controller 515 is configured to receive, from respective PIM 550A, 550B of displays 518A, 518B display status 550A, 550B. Host controller 515A may receive display status 518A from internal to first display 510, and display status 518B from display 510B (e.g., via a communications module of first display 510A, not depicted in FIG. 5).

The received display status 518A, 518B may each indicate a status of the respective displays 510A, 510B to output one or more sub-portions (e.g., lines) of respective first and second portions of an image displayed across displays 510A, 510B. Host controller 515 may compare the received display status 518A, 518B to one another and/or a predetermined threshold as described above. In response to the comparison, host controller 515 may communicate at least one display adjustment 519 to one or more of the first display 510A and the second display 510B. For example, if the comparison indicates that display 510A has presented less sub-portions of a first image portion than display 510B has presented of a second image portion, host controller 515 may communicate a display adjustment internal to display 510A (e.g., to an adjustment control module 482 of display 510A) to cause display 510A to reduce a delay of presentation of at least one sub-portion of a frame of the first image portion relative to at least one previously presented frame. According to another example, host controller 515 may communicate a display adjustment to display 510B (e.g., to a adjustment control module 482 of display 510B) to cause display 510B to increase a delay of presentation of at least one sub-portion of a frame of the second image portion relative to at least one previously presented frame. In this manner, host controller 515 of display 510A may synchronize operation of the first and second displays 510A, 510B to present respective first and second portions of an image split across the displays 510A, 510B.

In some examples, more than one of a plurality of displays may be configured to operate as a host controller 515 configured to control an image split across the plurality of displays. According to these examples, the plurality of displays may be configured to communicate amongst each other to determine which display of the plurality of displays is best suited to operate as host controller 515. For example, one or more of the plurality of displays may determine an amount of available computing, memory, communications, and/or power resources available to each of the plurality of displays, and assign one of the plurality to a display with the most available resources to operate as a host controller 515 as described herein.

Figure 6:
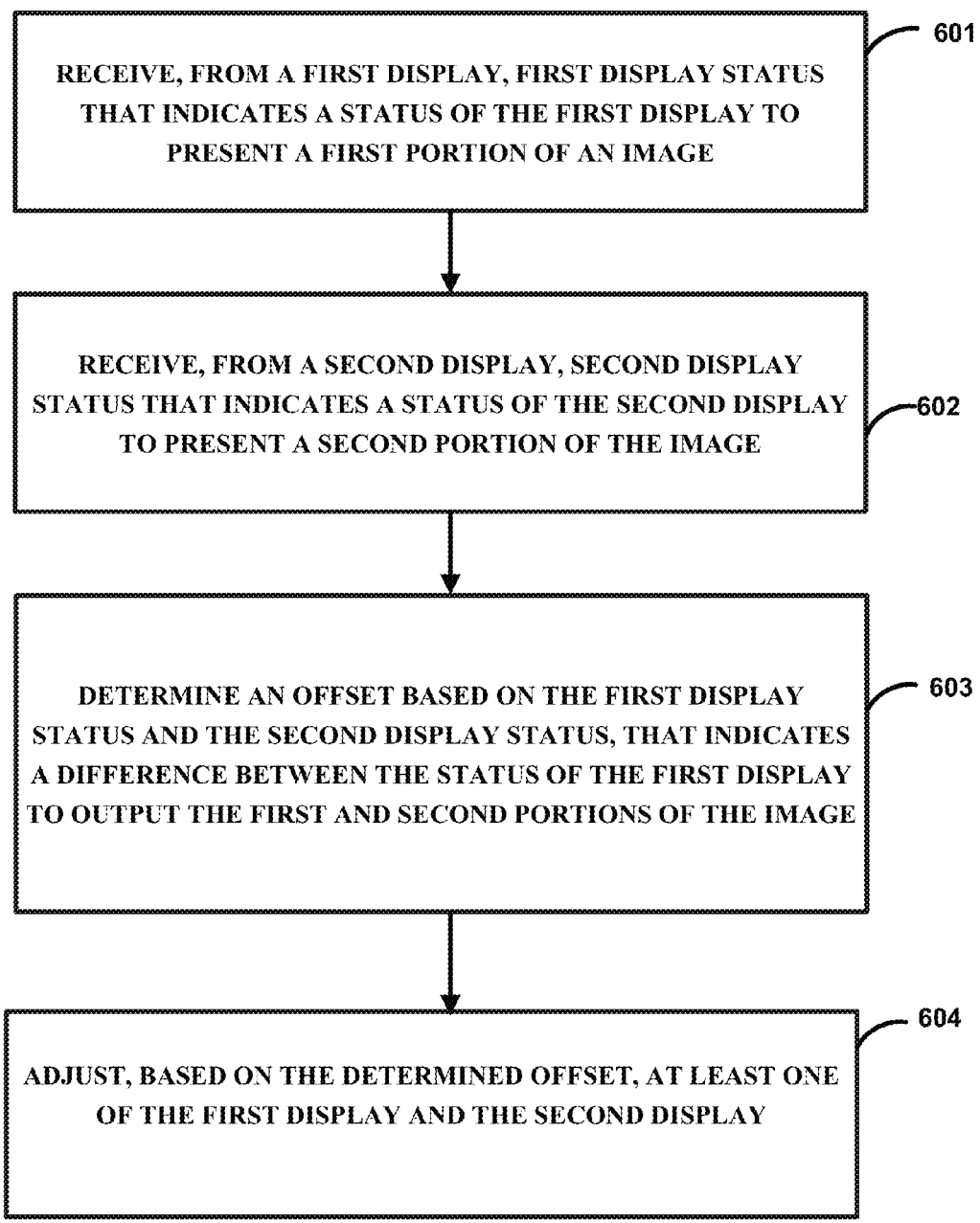
FIG. 6 is a flow diagram that illustrates an example of a method of controlling a plurality of displays consistent with the techniques of this disclosure.

FIG. 6 is a flow diagram that illustrates one example of a method of controlling a plurality of displays to split presentation of at least one image across the plurality of displays consistent with the techniques of this disclosure. As depicted in FIG. 1, a host controller 115, 215, 415, 515 of a computing device may receive a first display status 118A, 218A, 518A (601). The first display status may indicate a progress of a first display 110A, 210A, 310A, 510A to present at least one sub-portion (e.g., at least one of lines 341-346) of a first portion 116A of an image 116. As also depicted in FIG. 1, the host controller may receive a second display status 118B, 218B, 518B (602). The second display status may indicate a progress of a second display 110B, 210B, 310B, 510B to present at least one sub-portion (e.g., at least one line 361-366) of a second portion 116B of the image 116.

As also depicted in FIG. 6, the host controller may determine an offset 455 based on the first and second display status (603). The offset indicates a difference between a status of the first display to output the first portion of the image and a status of the second display to output the second portion of the image. The host controller may further delay, based on the determined offset, at least one of the first display to present the first portion of the image and the second display to present the second portion of the image (604). For example, the host controller may communicate a display adjustment that indicates to at least one of the first or second displays to modify a presentation time of at least one sub-portion (e.g., line and/or pixel) of the first portion or second portion of the image. In some examples, after timing adjustment has been performed using the display adjustment, the display may operate with normal blanking parameters (e.g., a standard number of blanking lines and/or pixels) until a next time when a determined offset between operation of the first and second displays to present respective first and second portions of an image becomes greater than a threshold. In some examples, a single display adjustment signal may be used by the host controller to synchronize operation of multiple displays. In other examples, multiple display adjustment signals may be used by the host controller to synchronize operation of the multiple displays, over the course of more than one presented frame of an image portion.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Various examples have been described. These and other examples are within the scope of the following claims.

The invention claimed is:

1. A method, comprising:
receiving, from a first display, a first display status that indicates a status of presentation of a first portion of an image by the first display, wherein the first display comprises an internal clock source configured to generate one or more reference clock signals, and wherein the first display presents the first portion of the image based on the one or more reference clock signals and based on at least one of image data and a set of graphics instructions, wherein the first display receives the at least one of the image data and the set of graphics instructions without synchronization information;
receiving, from a second display, a second display status that indicates a status of a presentation of a second portion of the image by the second display;
determining, based on the first display status and the second display status, a difference between the status of the presentation of the first portion of the image by the first display and the status of the presentation of the second portion of the image by the second display;
generating, based on the determined difference, an adjustment signal configured to adjust at least one of the presentation of the first portion of the image by the first display and the presentation of the second portion of the image by the second display; and
communicating the adjustment signal to at least one of the first display and the second display.

2. The method of claim 1, wherein each of the first display status and the second display status comprises one or more of a vsynch signal and an hsynch signal.

3. The method of claim 1, wherein the adjustment signal comprises:
an indication of a number of lines to adjust the at least one of the presentation of the first portion of the image by the first display and the second portion of the image by the second display.

4. The method of claim 1, wherein communicating the adjustment signal to the at least one of the first display and the second display comprises:
causing one or more of the at least one of the first display and the second display to modify a delay between a presentation of at least one sub-portion of a current frame relative to a presentation of at least one previous frame.

5. The method of claim 4, wherein causing the one or more of the at least one of the first display and the second display to modify the delay between the presentation of the at least one sub-portion of the current frame relative to the presentation of the at least one previous frame comprises:
causing the one or more of the at least one of the first display and the second display to modify at least one blanking interval associated with the at least one sub-portion of the current frame.

6. The method of claim 5, wherein the at least one blanking interval associated with the at least one sub-portion of the current frame comprises a horizontal blanking interval that comprises a plurality of blanking pixels, and wherein causing the one or more of the at least one of the first display and the second display to modify the horizontal blanking interval comprises:
causing the one or more of the at least one of the first display and the second display to add or delete one or more of the plurality of blanking pixels.

7. The method of claim 5, wherein the at least one blanking interval associated with the at least one sub-portion of the current frame comprises a vertical blanking interval that comprises a plurality of blanking lines, and wherein causing one or more of the at least one of the first display and the second display to modify the vertical blanking interval comprises:
causing the one or more of the at least one of the first display and the second display to add or delete one or more of the plurality of blanking lines.

8. The method of claim 7, wherein causing the one or more of the at least one of the first display and the second display to add or delete the one or more of the plurality of blanking lines comprises:
causing the one or more of the at least one of the first display and the second display to add at least one blanking line to the plurality of blanking lines to increase the delay between the presentation of the at least one sub-portion of the current frame relative to the presentation of the at least one previous frame.

9. The method of claim 7, wherein causing the one or more of the at least one of the first display and the second display to add or delete the one or more of the plurality of blanking lines comprises:
causing the one or more of the at least one of the first display and the second display to delete at least one blanking line of the plurality of blanking lines to reduce the delay between the presentation of the at least one sub-portion of the current frame relative to the presentation of at least one previous frame.

10. The method of claim 1, wherein communicating the adjustment signal to the at least one of the first display and the second display comprises communicating the adjustment signal to the first display.

11. A device, comprising:
    a display status module configured to receive, from a first display, a first display status that indicates a status of a presentation of a first portion of an image by a first display, wherein the first display comprises an internal clock source configured to generate one or more reference clock signals, and wherein the first display presents the first portion of the image based on the one or more reference clock signals and based on at least one of image data and a set of graphics instructions, wherein the first display receives the at least one of the image data and the set of graphics instructions without synchronization information, and receive, from a second display, a second display status that indicates a status of a presentation of a second portion of the image by the second display;
    an offset determination module configured to determine, based on the first display status and the second display status, a difference between the status of the presentation of the first portion of the image by the first display and the status of the presentation of the second portion of the image by the second display; and
    a display adjustment module configured to generate, based on the determined difference, an adjustment signal configured to adjust at least one of the presentation of the first portion of the image by the first display and the presentation of the second portion of the image by the second display, and communicate the adjustment signal to at least one of the first display and the second display.

12. The device of claim 11, wherein each of the first display status and the second display status comprises one or more of a vsynch signal an hsynch signal.

13. The device of claim 11, wherein the first display status indicates a status of a presentation of a number of sub-portions of the first portion of the image by the first display, and wherein the second display status indicates a status of a presentation of a number of sub-portions of the second portion of the image by the second display.

14. The device of claim 13, wherein the number of sub-portions of the first portion of the image comprise a number of lines of the first portion of the image, and wherein the number of sub-portions of the second portion of the image comprise a number of lines of the second portion of the image.

15. The device of claim 13, wherein, to determine the difference between the status of the presentation of the first portion of the image by the first display and the status of the presentation of the second portion of the image by the second display based on the first display status and the second display status, the offset determination module is configured to determine a difference between a number of lines of the first portion of the image presented by the first display and a number of lines of the second portion of the image presented by the second display.

16. The device of claim 11, wherein the adjustment signal comprises an indication of a number of lines to adjust the at least one of presentation of the first portion of the image by the first display and the presentation of the second portion of the image by the second display.

17. The device of claim 11, wherein the display adjustment module is further configured to:
    cause one or more of the at least one of the first display and the second display to modify a delay between a presentation of at least one sub-portion of a current frame relative to a presentation of at least one previous frame.

18. The device of claim 17, wherein to cause the one or more of the at least one of the first display and the second display to modify the delay between the presentation of the at least one sub-portion of the current frame relative to the presentation of the at least one previous frame, the display adjustment module is configured to:
    cause the one or more of the at least one of the first display and the second display to modify a number of blanking lines associated with the at least one sub-portion of the current frame.

19. The device of claim 18, wherein to cause the one or more of the at least one of the first display and the second display to modify the number of blanking lines associated with the at least one sub-portion of the current frame, the display adjustment module is configured to:
    cause the one or more of the at least one of the first display and the second display to add at least one blanking line to the number of blanking lines associated with the at least one sub-portion of the current frame to increase the delay between the presentation of the at least one sub-portion of the current frame relative to the presentation of the at least one previous frame.

20. The device of claim 18, wherein to cause the one or more of the at least one of the first display and the second display to modify the number of blanking lines associated with the at least one sub-portion of the current frame, the display adjustment module is configured to:
    cause the one or more of the at least one of the first display and the second display to delete at least one blanking line of the number of blanking lines associated with the at least one sub-portion of the current frame to reduce the delay between the presentation of the at least one sub-portion of the current frame relative to the presentation of the at least one previous frame.

21. The device of claim 11, wherein the first display includes the display adjustment module.

22. A device comprising:
    means for receiving, from a first display, a first display status that indicates a status of a presentation of a first portion of an image by the first display, wherein the first display comprises an internal clock source configured to generate one or more reference clock signals, and wherein the first display presents the first portion of the image based on the one or more reference clock signals and based on at least one of image data and a set of graphics instructions, wherein the first display receives the at least one of the image data and the set of graphics instructions without synchronization information;
    means for receiving, from a second display, a second display status that indicates a status of a presentation of a second portion of the image by the second display;
    means for determining, based on the first display status and the second display status, a difference between the status of the
    presentation of the first portion of the image by the first display and the status of the presentation of the second portion of the image by the second display;
    means for generating, based on the determined difference, an adjustment signal configured to adjust at least one of the presentation of the first portion of the image by the first display and the presentation of the second portion of the image by the second display; and
    means for communicating the adjustment signal to at least one of the first display and the second display.

23. The device of claim 22, wherein each of the first display status and the second display status comprises one or more of a vsynch signal an hsynch signal.

24. The device of claim 22, wherein the first display status indicates a status of a presentation of a number of sub-portions of the first portion of the image by the first display, and wherein the second display status indicates a status of a presentation of a number of sub-portions of the second portion of the image by the second display.

25. The device of claim 24, wherein the number of sub-portions of the first portion of the image comprise a number of lines of the first portion of the image, and wherein the number of sub-portions of the second portion of the image comprise a number of lines of the second portion of the image.

26. The device of claim 24, wherein the means for determining the difference between the status of the presentation of the first portion of the image by the first display and the status of the presentation of the second portion of the image by the second display based on the first display status and the second display status comprises means for determining a difference between a number of lines of the first portion of the image presented by the first display and a number of lines of the second portion of the image presented by the second display.

27. The device of claim 24, wherein the adjustment signal comprises:
an indication of a number of lines to adjust the at least one of the presentation of the first portion of the image by the first display and the presentation of the second portion of the image by the second display.

28. The device of claim 24, wherein the means for generating the adjustment signal and the means for communicating the adjustment signal comprise:
means for causing one or more of the first display and second display to modify a delay between a presentation of at least one sub-portion of a current frame relative to a presentation of at least one previous frame.

29. The device of claim 28, wherein the means for causing the one or more of the at least one of the first display and second display to modify the delay between the presentation of the at least one sub-portion of the current frame relative to the presentation of the at least one previous frame comprises:
means for causing the one or more of the at least one of the first display and the second display to modify a number of blanking lines associated with the at least one sub-portion of the current frame.

30. The device of claim 29, wherein the means for causing the one or more of the at least one of the first display and second display to modify the number of blanking lines associated with the at least one sub-portion of the current frame comprises:
means for causing the one or more of the at least one of the first display and the second display to add at least one blanking line to the number of blanking lines associated with the at least one sub-portion of the current frame to increase the delay between the presentation of the at least one sub-portion of the current frame relative to the presentation of the at least one previous frame.

31. The device of claim 29, wherein the means for causing the one or more of the at least one of the first display and the second display to modify the number of blanking lines associated with the at least one sub-portion of the current frame comprises:
means for causing the one or more of the at least one of the first display and the second display to delete at least one blanking line of the number of blanking lines associated with the at least one sub-portion of the current frame to reduce the delay between the presentation of the at least one sub-portion of the current frame relative to the presentation of the at least one previous frame.

32. The device of claim 22, wherein the first display includes the means for generating, based on the determined difference, the adjustment signal configured to adjust the at least one of the presentation of the first portion of the image by the first display and the presentation of the second portion of the image by the second display.

33. A non-transitory computer-readable storage medium comprising instructions configured to, upon execution by a computing device, cause the computing device to:
receive, from a first display, a first display status that indicates a status of presentation of a first portion of an image by the first display, wherein the first display comprises an internal clock source configured to generate one or more reference clock signals, and wherein the first display presents the first portion of the image based on the one or more reference clock signals and based on at least one of image data and a set of graphics instructions, wherein the first display receives the at least one of the image data and the set of graphics instructions without synchronization information;
receive, from a second display, a second display status that indicates a status of a presentation of a second portion of the image by the second display;
determine, based on the first display status and the second display status, a difference between the status of the presentation of the first portion of the image by the first display and the status of the presentation of the second portion of the image by the second display;
generate, based on the determined difference, an adjustment signal configured to adjust at least one of the presentation of the first portion of the image by the first display and the presentation of the second portion of the image by the second display; and
communicate the adjustment signal to at least one of the first display and the second display.

34. The non-transitory computer-readable storage medium of claim 33, wherein each of the first display status and the second display status comprises one or more of a vsynch signal an hsynch signal.

35. The non-transitory computer-readable storage medium of claim 33, wherein the first display status indicates a status of a presentation of a number of sub-portions of the first portion of the image by the first display, and wherein the second display status indicates a status of a presentation of a number of sub-portions of the second portion of the image by the second display.

36. The non-transitory computer-readable storage medium of claim 35, wherein the number of sub-portions of the first portion of the image comprise a number of lines of the first portion of the image, and wherein the number of sub-portions of the second portion of the image comprise a number of lines of the second portion of the image.

37. The non-transitory computer-readable storage medium of claim 35, wherein the instructions that cause the computing device to determine the difference between the status of the presentation of the first portion of the image by the first display and the status of the presentation of the second portion of the image by the second display based on the first display status and the second display status comprise instructions that cause the computing device to determine a difference between a number of lines of the first portion of the image presented by the first display and a number of lines of the second portion of the image presented by the second display.

38. The non-transitory computer-readable storage medium of claim 35, wherein the adjustment signal comprises an indication of a number of lines to adjust the at least one of the presentation of the first portion of the image by the first display and the presentation of the second portion of the image by the second display.

39. The non-transitory computer-readable storage medium of claim 35, wherein the instructions that cause the computing device to generate the adjustment signal and communicate the adjustment signal comprise instructions that cause the computing device to:
   cause one or more of the at least one of the first display and the second display to modify a delay between a presentation of at least one sub-portion of a current frame relative to a presentation of at least one previous frame.

40. The non-transitory computer-readable storage medium of claim 39, wherein the instructions that cause the computing device to cause the one or more of the at least one of the first display and the second display to modify the delay between the presentation of the at least one sub-portion of the current frame relative to the presentation of the at least one previous frame comprise instructions that cause the computing device to:
   cause the one or more of the at least one of the first display and the second display to modify a number of blanking lines associated with the at least one sub-portion of the current frame.

41. The non-transitory computer-readable storage medium of claim 39, wherein the instructions that cause the computing device to cause the one or more of the at least one of the first display and the second display to modify the number of blanking lines associated with the at least one sub-portion of the current frame comprise instructions that cause the computing device to cause the one or more of the at least one of the first display and the second display to add at least one blanking line to the number of blanking lines associated with the at least one sub-portion of the current frame to increase the delay between the presentation of the at least one sub-portion of the current frame relative to the presentation of at least one previous frame.

42. The non-transitory computer-readable storage medium of claim 39, wherein the instructions that cause the computing device to cause the one or more of the at least one of the first display and the second display to modify the number of blanking lines associated with the at least one sub-portion of the current frame comprise instructions that cause the computing device to:
   cause the one or more of the at least one of the first display and the second display to delete at least one blanking line of the number of blanking lines associated with the at least one sub-portion of the current frame to reduce the delay between the presentation of the at least one sub-portion of the current frame relative to the presentation of at least one previous frame.

43. The non-transitory computer-readable storage medium of claim 33, wherein the first display includes the non-transitory computer-readable storage medium.

44. The method of claim 1, wherein the adjustment signal comprises one or more of the following:
   an indication of one or more frames of a plurality of frames to which the adjustment signal is to be applied;
   an indication of a number of blanking lines or pixels within the one or more frames to which the adjustment signal is to be applied that are to be added or deleted;
   an indication of whether the number of blanking lines or pixels within the one or more frames to which the adjustment signal is to be applied are to be added or deleted; and
   an indication of whether a presentation of one or more frames of the plurality of frames by one or more of the at least one of the first display and the second display are to be reset.

45. The device of claim 11, wherein the adjustment signal comprises one or more of the following:
   an indication of one or more frames of a plurality of frames to which the adjustment signal is to be applied;
   an indication of a number of blanking lines or pixels within the one or more frames to which the adjustment signal is to be applied that are to be added or deleted;
   an indication of whether the number of blanking lines or pixels within the one or more frames to which the adjustment signal is to be applied are to be added or deleted; and
   an indication of whether a presentation of one or more frames of the plurality of frames by one or more of the at least one of the first display and the second display are to be reset.

46. The device of claim 22, wherein the adjustment signal comprises one or more of the following:
   an indication of one or more frames of a plurality of frames to which the adjustment signal is to be applied;
   an indication of a number of blanking lines or pixels within the one or more frames to which the adjustment signal is to be applied that are to be added or deleted;
   an indication of whether the number of blanking lines or pixels within the one or more frames to which the adjustment signal is to be applied are to be added or deleted; and
   an indication of whether a presentation of one or more frames of the plurality of frames by one or more of the at least one of the first display and the second display are to be reset.

47. The non-transitory computer-readable storage medium of claim 33, wherein the adjustment signal comprises one or more of the following:
   an indication of one or more frames of a plurality of frames to which the adjustment signal is to be applied;
   an indication of a number of blanking lines or pixels within the one or more frames to which the adjustment signal is to be applied that are to be added or deleted;
   an indication of whether the number of blanking lines or pixels within the one or more frames to which the adjustment signal is to be applied are to be added or deleted; and
   an indication of whether a presentation of one or more frames of the plurality of frames by one or more of the at least one of the first display and the second display are to be reset.

* * * * *